United States Patent
Oguchi

(10) Patent No.: US 7,175,085 B2
(45) Date of Patent: Feb. 13, 2007

(54) CARD READER

(75) Inventor: Koji Oguchi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 179 days.

(21) Appl. No.: 11/014,189

(22) Filed: Dec. 16, 2004

(65) Prior Publication Data

US 2005/0150954 A1 Jul. 14, 2005

(30) Foreign Application Priority Data

Dec. 17, 2003 (JP) ............................. 2003-419371
Oct. 25, 2004 (JP) ............................. 2004-309458

(51) Int. Cl.
*G06K 7/08* (2006.01)

(52) U.S. Cl. ...................... 235/451; 235/475; 235/479; 235/486; 235/492

(58) Field of Classification Search ................. 235/479, 235/475, 486
See application file for complete search history.

(56) References Cited

U.S. PATENT DOCUMENTS 5,646,392 A * 7/1997 Oguchi ....................... 235/475

6,494,364 B2 * 12/2002 Shepherd ..................... 235/379
6,820,806 B2 * 11/2004 Nagata et al. .............. 235/439
6,824,062 B2 * 11/2004 Hirasawa ..................... 235/479

FOREIGN PATENT DOCUMENTS

JP 2001-222686 8/2001

* cited by examiner

*Primary Examiner*—Seung Ho Lee
(74) *Attorney, Agent, or Firm*—Hogan & Hartson LLP

(57) ABSTRACT

A card reader includes a card locking mechanism locking a card medium in an immovable holding position when the card medium inserted from a card insertion port provided in a front section of a card reader body stops because of abnormal stopping, thus preventing wrongful removal of the card medium by withdrawal. The card locking mechanism includes a spindle able to rotate via a spindle pin at one end inside the card reader body at the card insertion port, and a stopper configuration enabling direct contact with a surface of the card medium provided along a periphery at another end. A rotation radius includes a distance from the spindle pin to the stopper configuration being gradually increased from one end of the stopper configuration to another end to increase locking force by contact with the card medium.

17 Claims, 9 Drawing Sheets

CARD READER

BACKGROUND OF THE INVENTION

1. Field of the Invention

The present invention relates to a card reader. More specifically, the present invention relates to a configuration for preventing fraudulent use of a card medium in a card reader.

2. Description of Related Art

In card reader 101 of conventional technology, as shown in FIG. 10, the security of card reader 101 is achieved by providing shutter 102 that is opened or closed by a solenoid, for example, in a card insertion port to prevent the insertion of a foreign object other than card medium 103, and also to prevent theft by fraudulent removal of card medium 103 which is caught in card reader 101.

Card reader 101 is provided with shutter 102 such that if card medium 103 is inserted from insertion port 104, shutter 102 retreats from the card path and the inserted card medium 103 is taken into card reader 101.

Moreover, if card medium 103 enters beyond shutter 102, the shutter 102 closes to prevent withdrawal of card medium 103 by wrongful actions.

Here, an ill-intentioned person may tamper with card reader 101 so that when a rightful user inserts card medium 103 into card reader 101, it is caught inside. As soon as the owner of card 103 leaves the site, card medium 103 is removed to be used for fraudulent actions.

To prevent such fraudulent actions, a card reader has been developed in which the card medium is deformed by blowing hot air when abnormal stopping of card medium is detected in the unit to make the removed card medium unusable. A card reader has also been developed in which a sharp needle is pressed on the magnetic stripe of the card medium to destroy data recorded in the magnetic stripe, when abnormal stopping of the card medium is detected inside the unit.

However, a card reader of the aforementioned type which deforms the card medium by means of blowing hot air or the like is not preferable because the card medium is damaged even though the card medium stopped abnormally for reasons other than abnormal stopping for wrongful removal.

Moreover, in a card reader of the type in which a sharp needle is pressed onto a magnetic strip, the effects of data destruction cannot be expected for the card medium having an IC chip, because the IC chip cannot be destroyed.

Hence, room for further improvement remains for the conventional card readers.

In other words, the improvement should be able to deal with attempts by a wrongdoer to remove the card medium by exerting force to pull out the card medium that is stronger than the locking force that keeps the card medium in the holding position, whether by piercing the card medium with a sharp-pointed member or by pressing a rubber pad on the surface of the card medium.

Furthermore, in a structure in which wrongful removal is prevented by hooking a lock pawl to the surface of a card medium, a locking force derived from the lock pawl is effective when a wrongdoer applies a force in the direction in which the card medium is pulled out.

However, if the wrongdoer applies a force in the direction in which the card medium is pushed in, and alternates the pulling and pushing forces persistently in an attempt to wrongfully remove the card medium, the lock pawl cannot apply a locking force in the reverse against the push-in force.

Accordingly, the present invention has the purpose of providing a card reader from which an IC card cannot be pulled out in a usable state when the IC card has been inserted.

The present invention also has the purpose of providing a card reader that effectively prevents a card medium inserted from the card insertion port from being removed by a wrongdoer and used fraudulently.

SUMMARY OF THE INVENTION

To achieve the above advantages, the present invention provides a card reader in which a card medium having an IC chip is conveyed in a card path by a drive roller rotationally driven by a motor to perform predetermined processing. The card reader includes a needle, which can pierce the card path and protrude from the rear side of the IC chip at a position where the IC chip of the IC card is conveyed and a peeling mechanism having a driving device, by means of which the needle protrudes, and additionally having means whereby when the card medium stops abnormally in the card reader. The IC chip is peeled from the card medium by protrusion of the needle by the driving mechanism.

Therefore, when the card medium stops abnormally in the card reader, the driving device causes the needle to protrude from the rear side of the IC chip, if the card medium is pulled out, the needle penetrates the IC card to damage the IC chip or peels it from the card medium. As a result, the card medium cannot be used even if it is pulled out forcibly.

Moreover, in the card reader of the present invention, it is preferable that the driving device is a motor.

Therefore, a damaging force to the card medium can be adjusted by regulating the rotational speed of the driving device.

Namely, the damaging force can be reduced by increasing the rotational speed or it can be increased by decreasing the rotational speed. Furthermore, it is possible to exert control so that the needle protrudes with a weak force, strikes the card medium, and then intensifies its pressure.

Furthermore, in the present invention, the needle is provided in the vicinity of the card insertion port in the card reader.

Therefore, if a card medium is taken far back into the card reader when it stops abnormally, the card cannot be pulled out because of the needle protruding in the card path.

Furthermore, in the present invention, the card reader is provided with a card locking mechanism locking card medium in holding a position by an obstructing motion, when the card medium inserted from card insertion port provided in the front section of the card reader body stops because of abnormal stopping, thus preventing wrongful removal of the card by pulling the card out. The card locking mechanism is provided with a spindle able to rotate via a spindle pin at one end inside of a card reader body at the card insertion port. Moreover, the mechanism is provided with stopper configuration enabling contact with the surface of the card medium provided a along the periphery at the other end. A rotation radius including a distance from the spindle pin to the stopper configuration is gradually increased from one end of the stopper configuration to the other end to increase a locking force by contact with the card medium.

According to the present invention, the card reader can obstruct the movement of the card medium and lock it in a holding position by allowing the lock member of the card locking mechanism to have the stopper configuration come into contact with the surface of the abnormally stopped card medium and by gradually increasing this contact force to increase the locking force.

Moreover, in the present invention, it is preferable for the card reader to have the stopper configuration of the lock member molded into serrations which come into contact with and bite into the card medium gradually from one end to the other end.

In this case, the stopper configuration of the lock member is formed into serrations to bite into the card medium from the surface.

Furthermore, in the present invention, the card reader is characterized by the fact that multiple sheets of the serrated stopper configuration are laminated to increase the contact area of the lock member to the card medium. In this case, it is preferable to increase the contact area with the lock member by increasing the thickness in the thickness direction of the serrated stopper configuration.

It is also preferable in the present invention, for the card reader to have the stopper configuration of the lock member molded into a shape like a cam face so that the contact pressure on contact gradually increases from one end to the other end.

In this case, the use of a shape like a cam face for the stopper configuration of the lock member increases the contact pressure on the card medium from the cam face as the rotation radius from the spindle pin gradually increases.

Further, in the present invention, it is preferable for the card reader that the stopper configuration of such lock member is a one-way rotor which increases contact pressure to the card medium in one direction so that the pressure contact force gradually increases from one end to the other end.

In this case, the one-way rotor can apply contact pressure to the card medium only in one direction without applying contact pressure in the reverse direction.

Further, in the present invention, it is preferable for the card reader that the card locking mechanism further includes a movable member which is connected to the lock member via a spindle pin and is capable of providing reciprocal motion in the direction toward the card insertion port. This movable member is activated when the signal detects abnormal stopping of the card medium. The lock member is rotated forward around the axis of the spindle pin so the stopper configuration comes into contact with the card medium and locking is possible.

In this case, the movable member, by its reciprocal motion, transmits the change via the spindle pin in accordance with the change in the rotary motion of the lock member. When the card medium stops abnormally, it rotates forward to move the lock member from the normal position until it contacts the surface of the card medium.

In other words, when the abnormal stopping of the card medium is detected, power received from the drive source causes the movable member to move forward, and the lock member at the normal position is rotated forward.

Moreover, in the present invention, it is preferable for the card reader that the movable member is provided with a push-back prevention locking mechanism which stops the reverse rotation of the lock member. This restricts its backward motion by locking, when the card medium is pushed back in reverse by a wrongful action.

In this case, if the card medium is pushed back in reverse by a wrongful action, the lock member rotates in reverse to decrease the locking force on the card medium. To prevent such inexpedience, the push-back prevention locking mechanism can be operated to block the backward motion of the movable member and effect locking.

Furthermore, in the present invention, it is preferable for the card reader that the push-back prevention locking mechanism is provided with an elongated hole inclined in the lengthwise direction, which is the direction of reciprocal motion in the movable member. A lock pin is engaged with the inclined elongated hole and can move together with the movable member. By engagement with the lock position on the slanted face in the inclined elongated hole in the lock pin, backward motion of the movable member is restricted.

In this case, the lock pin is moved in the inclined elongated hole together with the movable member. When the lock pin is moved to a predetermined position it is inserted into the slanted face of the inclined elongated hole (as illustrated in a practical embodiment, the insertion at the slanted face acts in concert with the horizontal elongated hole of the stationary frame fixed to the housing body).

BRIEF DESCRIPTION OF THE SEVERAL VIEWS OF THE DRAWINGS

FIGS. 9 and 9A is a side view showing enlarged principal parts of the push-back prevention locking mechanism in the card locking mechanism of the practical embodiment.

DETAILED DESCRIPTION OF THE INVENTION

The constitution of the present invention is described in detail below, with reference to the embodiments shown in the figures.

Figure 1:
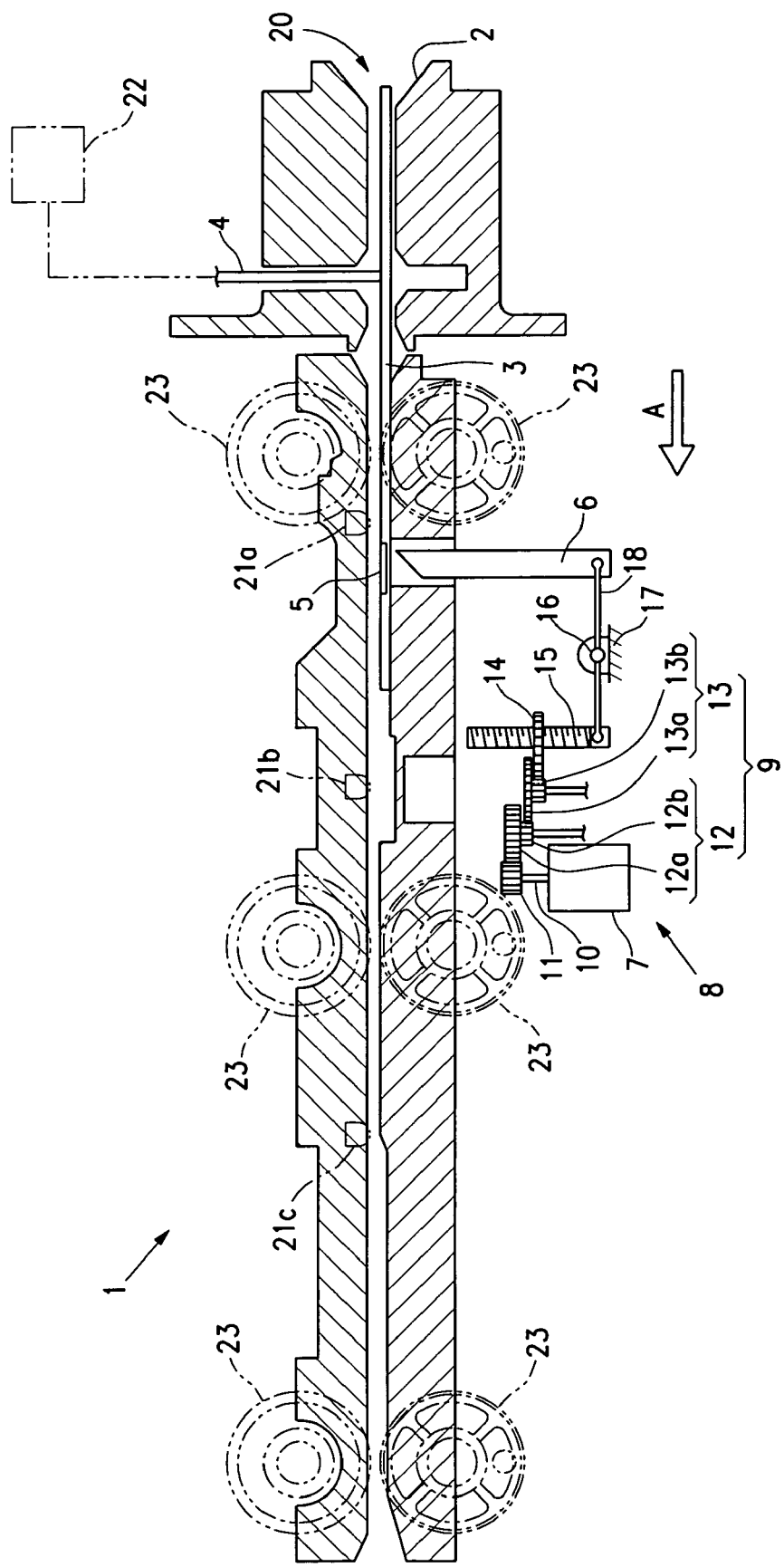
FIG. 1 is a side view showing the outline of card reader of an embodiment of the present invention.
Figure 3:
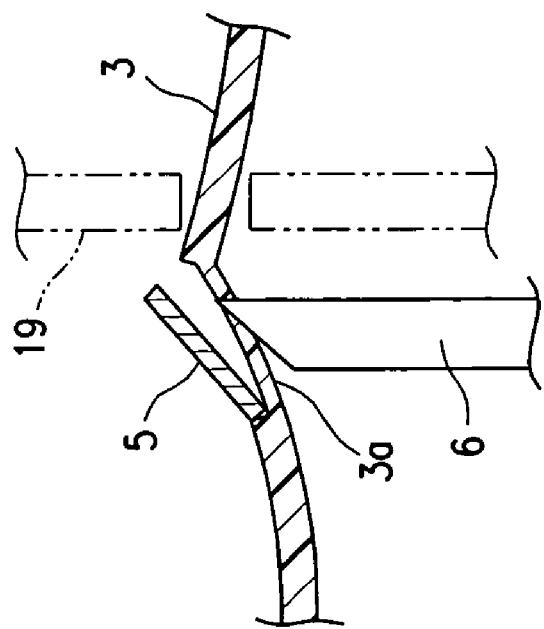
FIG. 3 is a fragmentary sectional side view showing the state after a needle pushes us an IC chip.
Figure 2:
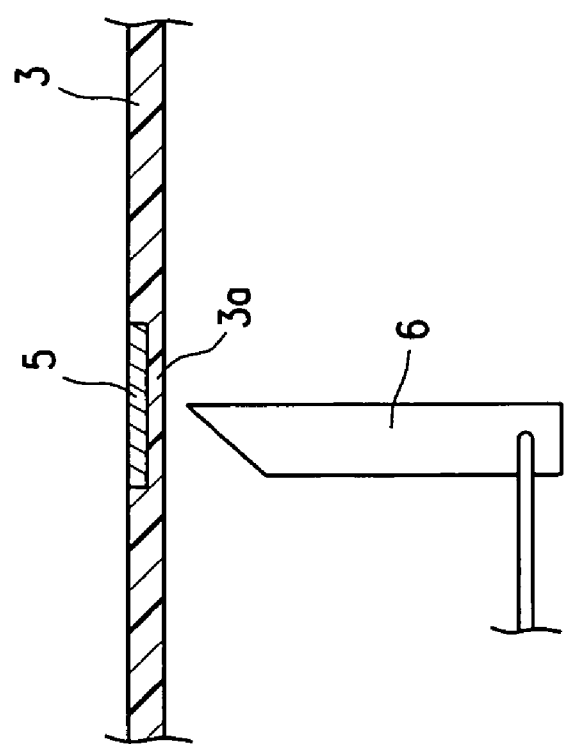
FIG. 2 is a fragmentary sectional side view showing the state before a needle pushes up an IC chip.
Figure 4:
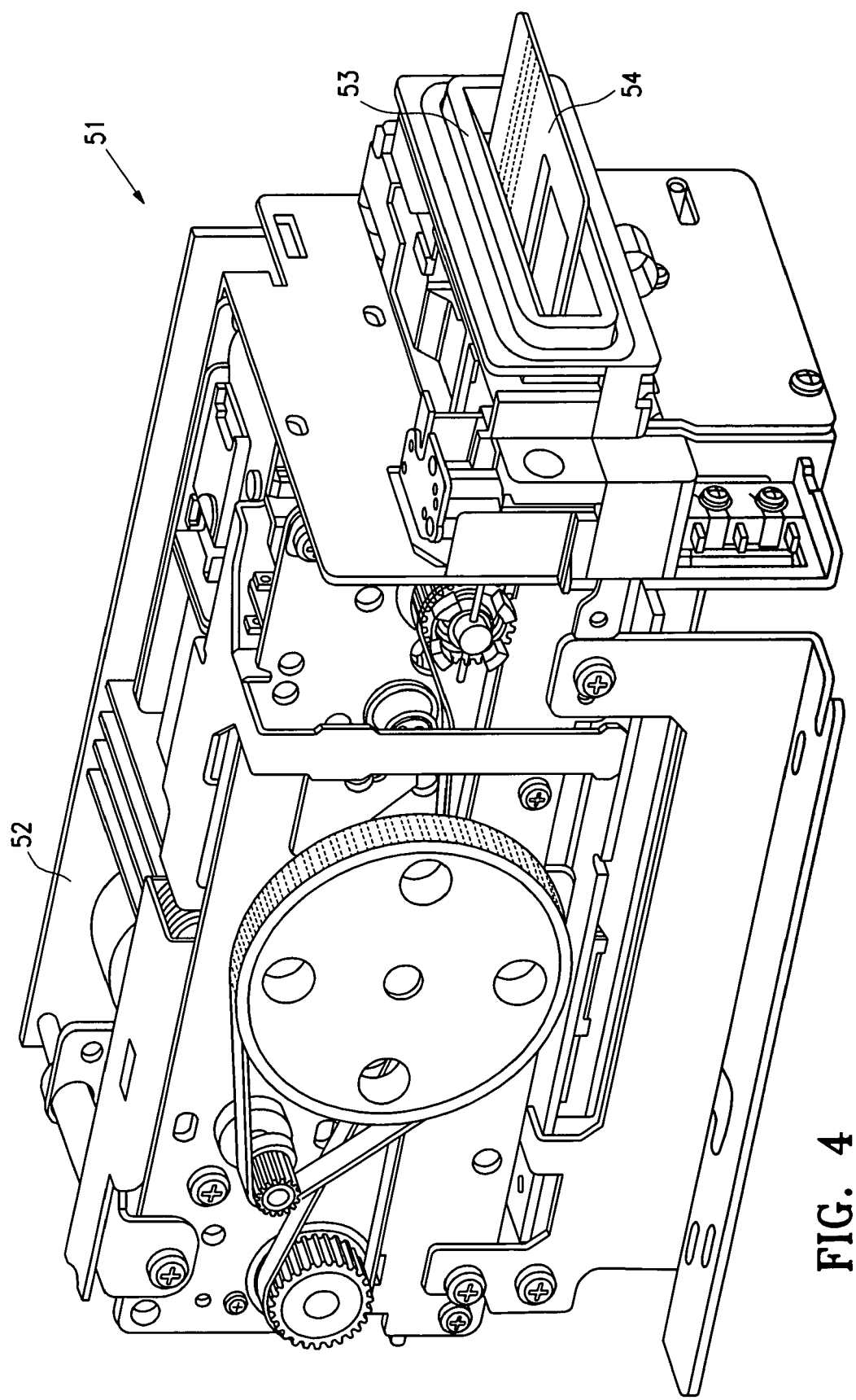
FIG. 4 is a perspective view showing one example of practical embodiment of a card reader body based on an embodiment of the present invention.

One example of an embodiment of a card reader 1 of the present invention is shown in FIG. 1–3. Card reader 1 conveys IC card 3, which is a card medium provided with IC chip 5, in card path 20 by means of drive roller 23 rotationally driven by a drive motor to perform a predetermined processing. Card reader 1 is provided with needle 6 that can protrude from the rear side of IC chip 5 by piercing card path 20 at the location where IC chip 5 on IC card 3 is being conveyed, and provided with peeling mechanism 8 that has driving device 7 to effect protrusion of needle 6.

When IC card 3 is abnormally stopped in card reader 1, driving device 7 causes needle 6 to protrude and peel IC chip 5 from IC card 3.

Driving device 7 is a motor. Therefore, a damaging force to IC card 3 can be adjusted by adjusting the rotational speed of driving device 7.

That is, the damaging force can be reduced by increasing the rotational speed, or the damaging force can be increased by decreasing the rotational speed.

Needle 6 is positioned near card insertion port 2. The tip of needle 6 has a sharp shape. There are no particular restrictions on material and shape of needle 6. However, in order to peel IC chip 5 away from IC card 3, it is desirable to have a needle of a metallic material having a high hardness and a strength, with sharply pointed tip.

Moreover, needle 6 is attached to the frame of card reader 1 so that it can appear and disappear in the direction perpendicular to the card conveying direction A.

As shown in FIG. 3, thin portion 3a of the IC card 3 embedded with the IC chip 5 can be deformed to peel off the IC chip by pressing or piercing needle 6 into the rear side of IC chip 5.

Alternatively, the pressing or piercing of needle 6 into IC card 3 can prevent IC card 3 from being forcibly pulled out.

Moreover, card reader 1 is provided with shutter 4, capable of opening and closing freely at card insertion port 2, so that IC card 3 can be taken into card reader 1.

Transmission mechanism 9 is provided between driving device 7 and needle 6. Transmission mechanism 9 is equipped with a pinion 11 provided on rotary shaft 10 of the driving device 7, and No. 1 gear 12 having a large toothed wheel 12a engaged with the pinion 11 and small gear 12b; No. 2 gear 13 having large toothed wheel 13a engaged with small gear 12b of No. 1 gear 12 and small gear 13b; No. 3 gear 14 having female screw-type internal teeth and external teeth engaged with small gear 13b of No. 2 gear 13; and movable lead screw 15 engaged with the internal teeth of No. 3 gear 14 and rockable arm 18 which connects lead screw 15 and needle 6 together, has one part fixed on frame 17 via support shaft 16.

By rotation of driving device 7, needle 6 protrudes through pinion 11→No. 1 gear 12→No. 2 gear 13→No. 3 gear 14→movable lead screw 15→rockable arm 18, in that order.

Moreover, card reader 1 is provided with abnormal stop detecting device 21 to detect abnormal stopping of the IC card 3.

Such abnormal stop detecting device 21 may utilize, for example, multiplicity of card detection sensors that detect the presence of IC card 3 in card path 20.

In this practical embodiment, the respective locations include No. 1 card detection sensor 21a located before needle 6; No. 2 card detection sensor 21b located within the length of the IC card 3 as measured from shutter 4, more toward the inside of the card conveyance direction than No 1 card detection sensor 21a, and No. 3 card detection sensor 21c located at a position farther away from shutter 4 than the length of IC card 3, more toward the inside of the card conveyance direction than No. 2 card detection sensor 21b.

With the card detection sensors 21 thus arranged, under normal conditions, the card detection sensors 21a, 21b, 21c sequentially detect IC card 3 as IC card 3 is conveyed. Nevertheless, when No. 1 card detection sensor 21a detects IC card 3 but No. 2 card detection sensor 21b does not detect IC card 3 after a predetermined time elapses from the first detection, or No. 1 and No. 2 card detection sensors 21a, 21b detect the IC card 3 but No. 3 card detection sensor 21c does not detect the IC card 3 after a predetermined time elapses from the first detection, the IC card is considered to have stopped abnormally.

An abnormal stopping of the IC card 3 is thus detected by using card detection sensors 21a, 21b, 21c. Of course, the number and locations of installed card detection sensors 21 are not limited to the above.

Furthermore, detection sensor 22 detecting an open position of the shutter 4 is connected to shutter 4. If shutter 4 is in a closed state, even though an abnormal stopping of IC card 3 is detected, a wrongdoer intending to use IC card 3 fraudulently cannot withdraw IC card 3. However, if the shutter 4 is in an open state, the wrongdoer will be able to pull out IC card 3.

Accordingly, when abnormal stopping of the IC card 3 is detected by the card detection sensors 21 and the shutter 4 is detected to be in an open state by the detection sensor 22, the peeling mechanism 8 is operated to prevent an illegal withdrawal of the IC card 3.

Card reader 1 constituted in the manner described above can prevent IC card 3 as card medium from theft and fraudulent use in the following manner.

If IC card 3 is inserted into the card insertion port 2, shutter 4 is opened, the driving rollers 23 rotate, and IC card 3 is taken into card reader 1. Here, if card detection sensors 21a, 21b, 21c sequentially detect the presence of the card in card path 20, the situation is judged to be normal and peeling mechanism 8 does not operate.

Then the IC card 3 is taken into a predetermined position, shutter 4 is closed, and predetermined processing is performed for IC card 3.

On the other hand, when an abnormal stopping of the IC card 3 is detected by card detection sensors 21 and shutter 4 is also detected to be in an open state by detection sensor 22, peeling mechanism 8 is operated to prevent wrongful withdrawal of IC card 3. In other words, driving device 7 of peeling mechanism 8 is driven, and needle 6 is made to protrude into to the card path 20 via transmission mechanism 9. Then, needle 6 is pushed up from the rear side of IC card 3 to peel the IC chip 5.

Even though the needle 6 does not touch the rear side of the IC chip 5 at this time, because needle 6 contacts IC card 3 at a point more toward card insertion port 2 side than IC chip 5, if an attempt is made to pull out IC card 3, IC chip 5 is peeled off when needle 6 is positioned right in back of IC chip 5.

IC chip 5 that is pushed out, as shown in FIG. 3, is caught by gate 19 provided in the vicinity of card insertion port 2, is reliably peeled off, and left inside the card reader 1.

Accordingly, even if the mount for IC card 3 is pulled out, data will not be used for wrongdoing because IC chip 5 is not pulled out.

Moreover, if IC card 3 is located more toward the inside from the needle 6, IC card 3 cannot be pulled out because needle 6 blocks card path 20.

Accordingly, even if the user of IC card 3 leaves card reader 1 to call a clerk, fraudulet use of IC card 3 by a wrongdoer is prevented because IC chip 5 has been peeled off IC card 3 that is pulled out, or else IC card 3 cannot be pulled out from card reader 1.

Driving device 7 may be rotated in reverse to return the needle 6 from the protrusion position to a retreat position.

Furthermore, the above-mentioned embodiment is one example embodiment of the present invention, but embodiments are not limited to the above, and various modifications are possible as long as there is no deviation from the substance of the present invention.

For example, the tip of needle 6 has a sharp configuration in this embodiment, but the configuration is not limited to this and may be flat.

In this case, IC chip 5 can be peeled off by pushing IC chip 5 from the rear side; at the same time, the damage to IC card 3 can be minimized because IC card 3 is not pierced.

Furthermore, driving device 7 is a motor in the above-mentioned embodiment but is not limited thereto, and may also be a solenoid.

Furthermore, driving device 7 is an exclusive member in the above-mentioned embodiment but is not limited thereto, and other actuators employed in the card reader 1 may also be used in common.

For example, a switch mechanism for abnormal occurrence may be provided, and one of solenoid for IC contacts, solenoid for shutter, conveying motor, etc. may also be used as a drive source.

Then, the needle 6 is positioned near the card insertion port 2 in the above-mentioned embodiment, but it is not limited thereto and may also be positioned on the interior side of card reader 1.

Furthermore, in the above-mentioned practical embodiment, peeling mechanism 8 operates only when abnormal stopping of IC card 3 is detected, but limitations are not imposed thereby. When abnormal stopping of IC card 3 is detected, card detection sensor 21 may be utilized to detect IC card 3 motion other than for regulation, before operating needle 6.

The constitution of the present invention is described in detail below, with reference to the embodiments shown in the figures.

One example of another practical embodiment of a card reader of the present invention is shown in FIG. 4–FIG. 9. This card reader has card reader body 51 and is provided with card insertion port 53 for a card medium 54 inserted by a customer in front of its housing body 52.

Further, housing body 52 is provided therein, with card locking mechanism 60 that has drive source 55 operating card reader body 51, and is turned on and off by power output transmitted from drive source 55 via transmission mechanism.

When card medium 54 inserted from card insertion port 53 stops abnormally and is held therein due to the failure of mechanical component or electrical system in card reader body 51, or due to wrongful action, card locking mechanism 60 is the device that prevents card medium 54 from being pulled out by a third-party wrongdoer intent on wrongdoing, at the instant the cardholder leaves the site leaving shutter (omitted in figures) in an open state.

To prevent theft and fraudulent use of the card medium 54, the above card locking mechanism 60 is provided with the following two locking functions which include the substance of the present invention.

One of the locking functions includes a locking function that prevents movement of card medium 54 from the stop position, that locks by exerting force opposing the pull-out force, when a wrongdoer attempts to remove the stopped card medium 54 by pulling out willy-nilly; the pull-out prevention locking mechanism operates.

The other locking function includes a locking function that prevents movement of card medium 54 from the stop position, that locks by exerting force opposing the reverse push-back force, when a wrongdoer attempts to remove card medium 54 by exerting force, persistently alternating between the reverse push-in force and the pull-out force on card medium 54; the pull-out prevention locking mechanism operates.

Both lock mechanisms are explained below.

First, as shown in FIG. 5–FIG. 8, the pull-out prevention locking mechanism has a stationary frame 61 fixed inside the housing body 52 and a movable frame 62, which is a slender movable member of the present invention capable of reciprocal and flexible motion, guided by stationary frame 61.

Tip 62b at the right end in the diagram of movable frame 62 is connected to one end of a conversion lever 63 by means of connecting pin 64; the other end of this conversion lever 63 is connected in a rotatable manner to a lock lever 70, which is the lock member of the present invention, via connecting pin 65.

Figure 5:
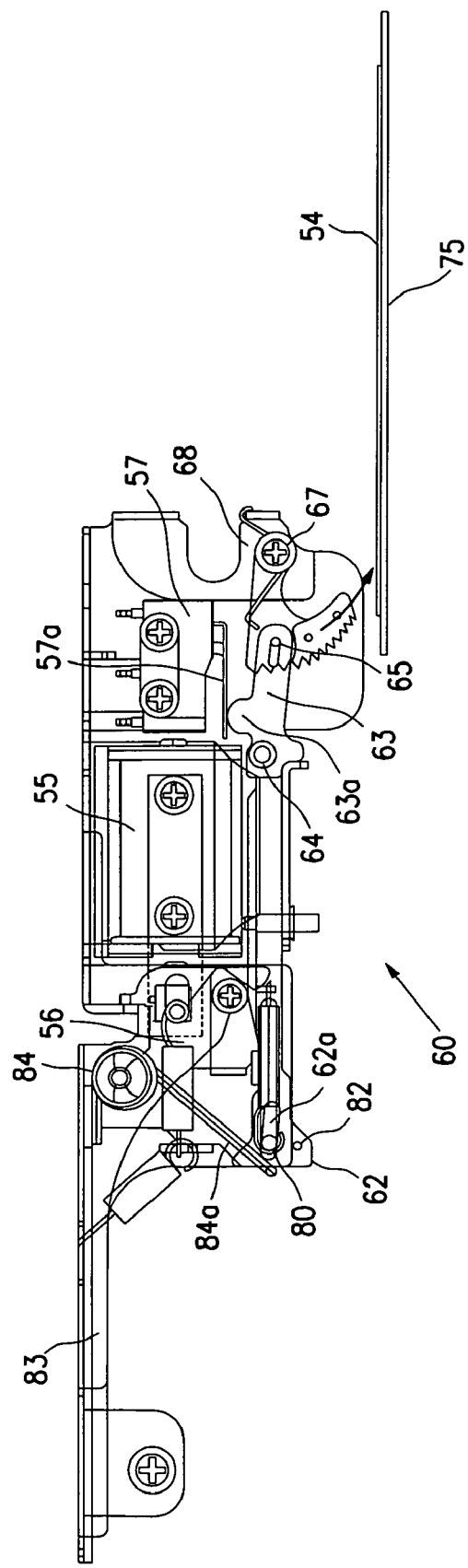
FIG. 5 is a side view showing the pull-out prevention locking mechanism in a card locking mechanism of the practical embodiment before activation.
Figure 6:
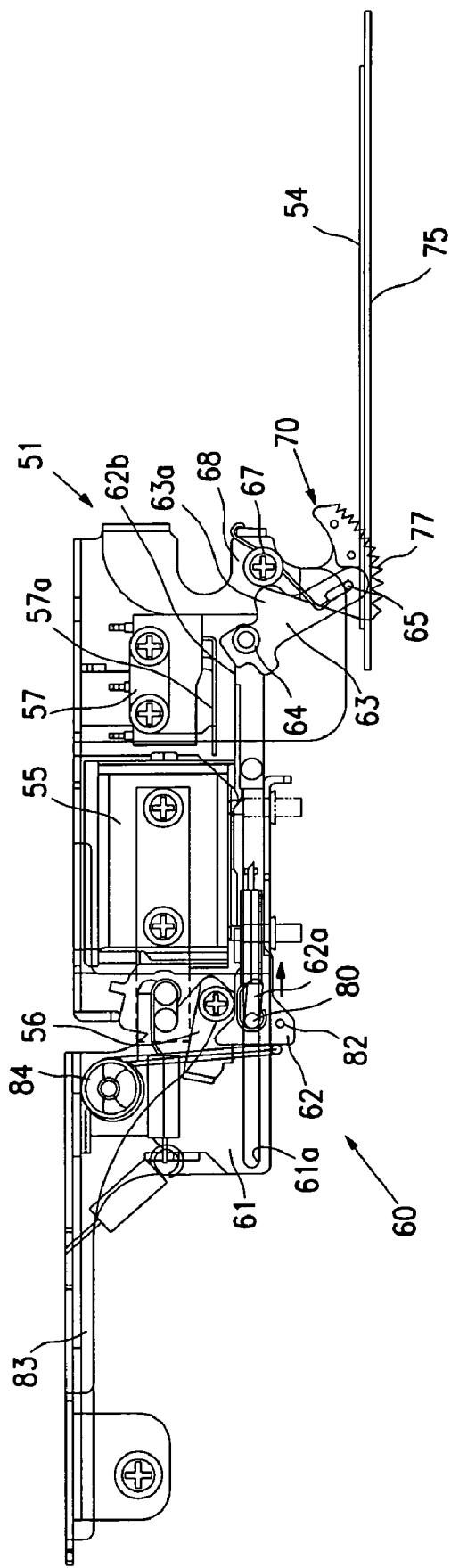
FIG. 6 is a side view showing the pull-out prevention locking mechanism in a card locking mechanism of the practical embodiment after activation.

Movable frame 62 is guided to move flexibly along stationary frame 61 from the normal position (return position) in FIG. 5, and can move forward through a predetermined stroke distance as shown in FIG. 6.

As described later, movable frame 62 is energized to move in the forward direction from the normal position by energizing spring 81 (see FIG. 9), and is held in the normal position by holding device 56 opposing the elastic force of the energizing spring 81.

Holding device 56 operates when it receives power from above drive source 55, releases movable frame 62 from being held so it moves forward by means of energizing spring 81.

In other words, a link structure is so constructed that such forward and backward motions of movable frame 62 is transmitted as a rotary motion to conversion lever 63, and is converted to a rotary motion of the lock lever 70 via conversion lever 63.

Figures 7, 7A:
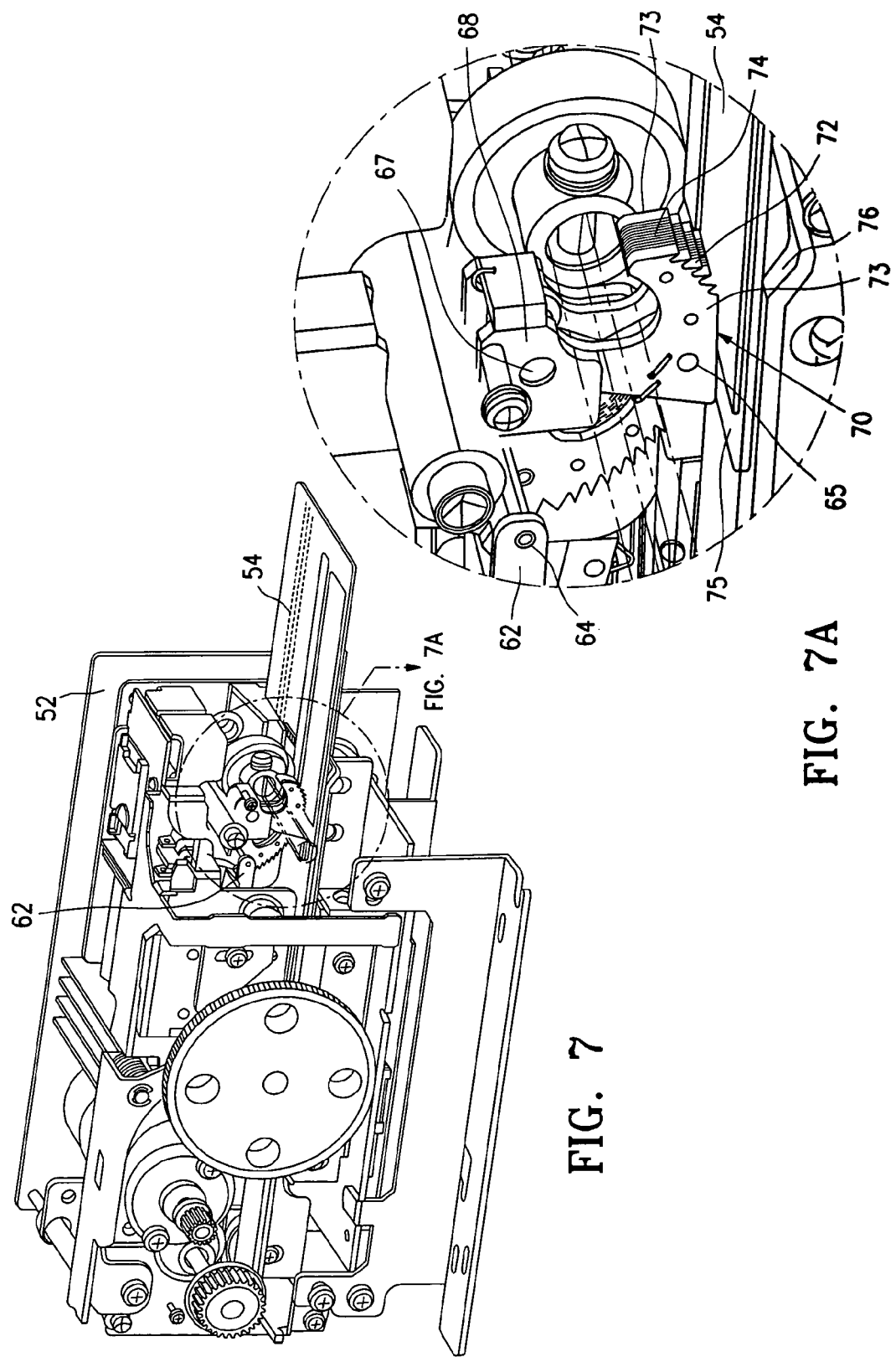
FIGS. 7 and 7A is an enlarged perspective view showing the lock lever in the pull-out prevention locking mechanism of the practical embodiment.
Figure 8:
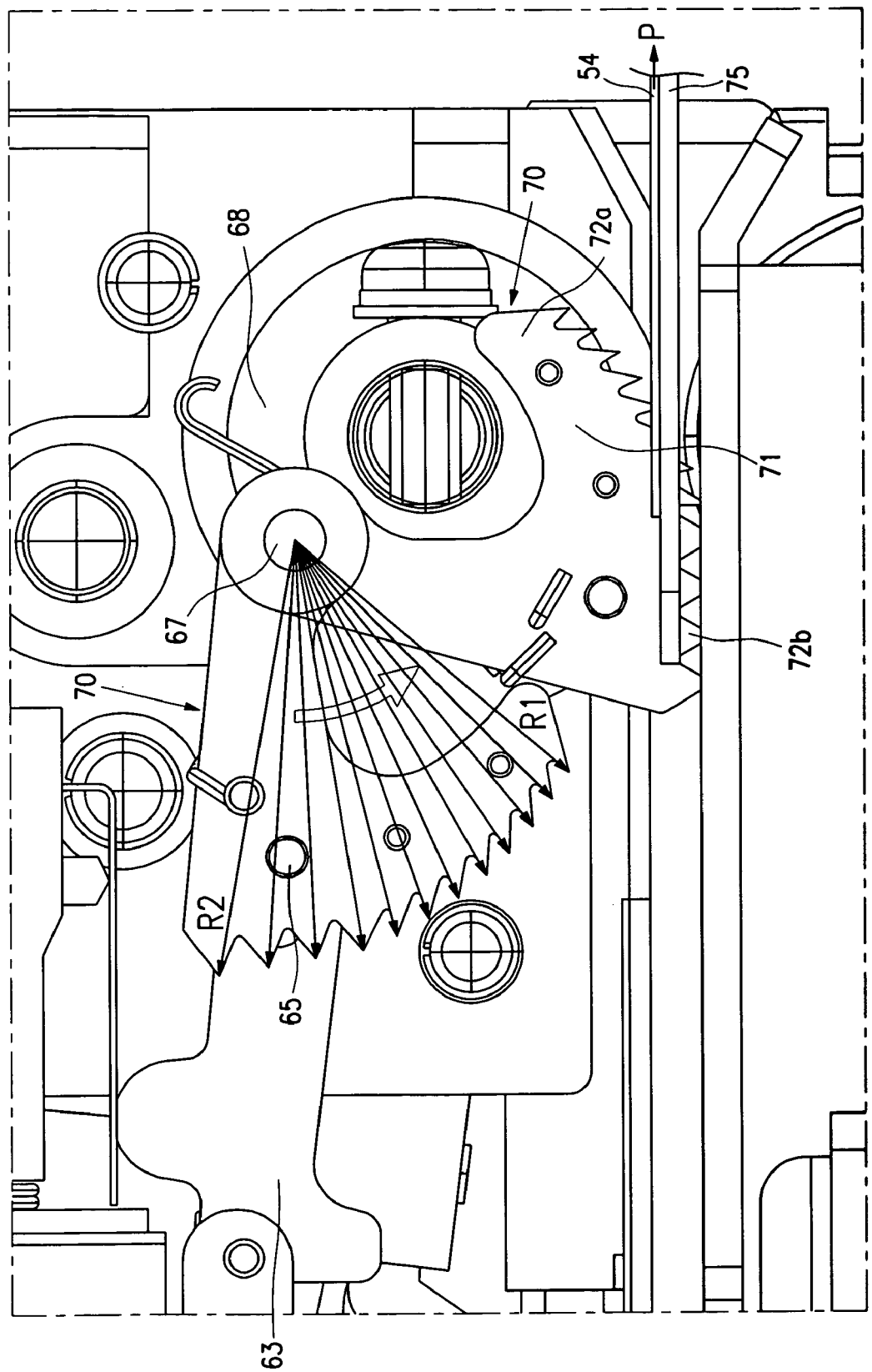
FIG. 8 is a side view showing the lock lever entity of the practical embodiment.
Figure 9:
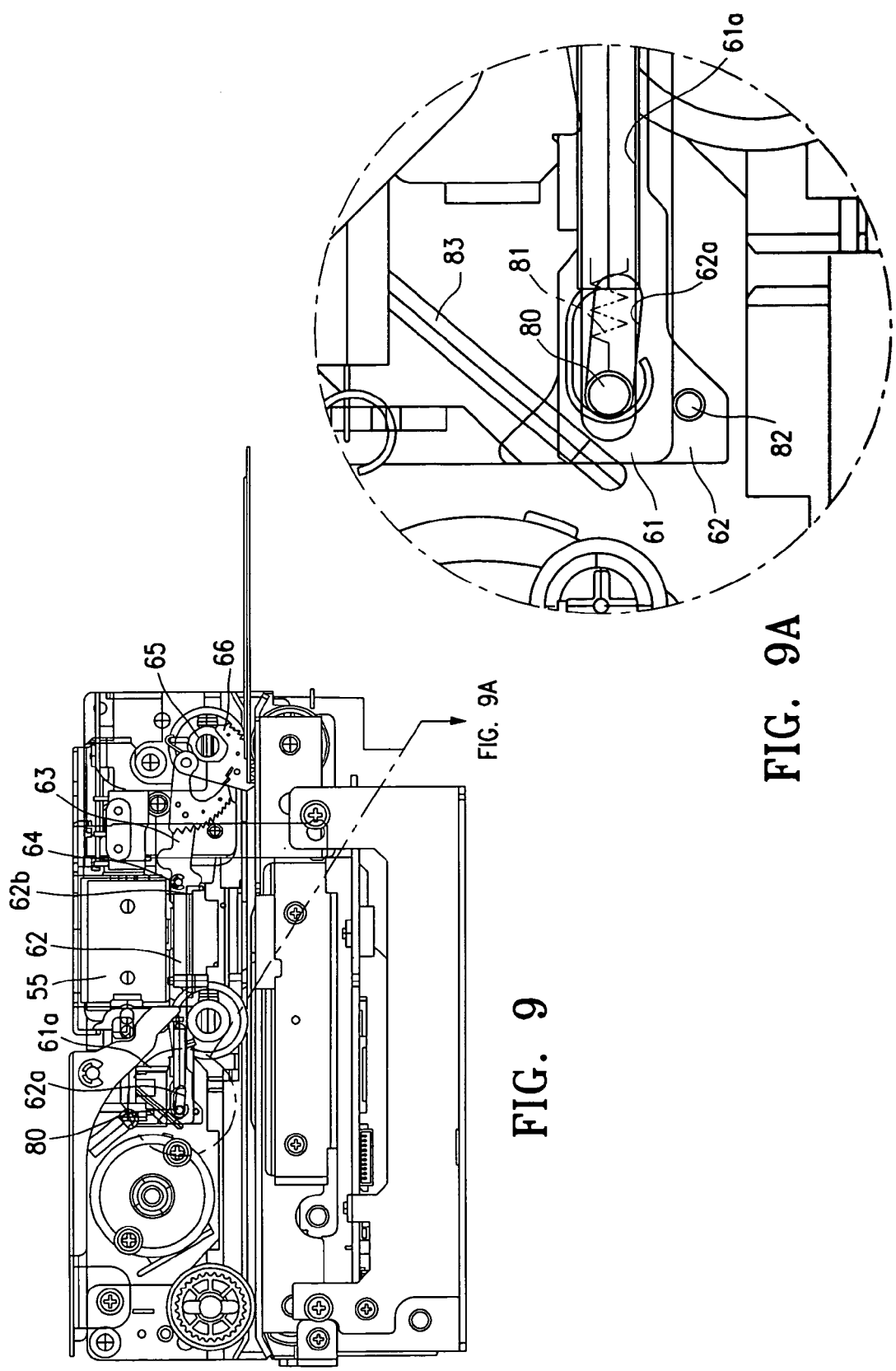
Figure 10:
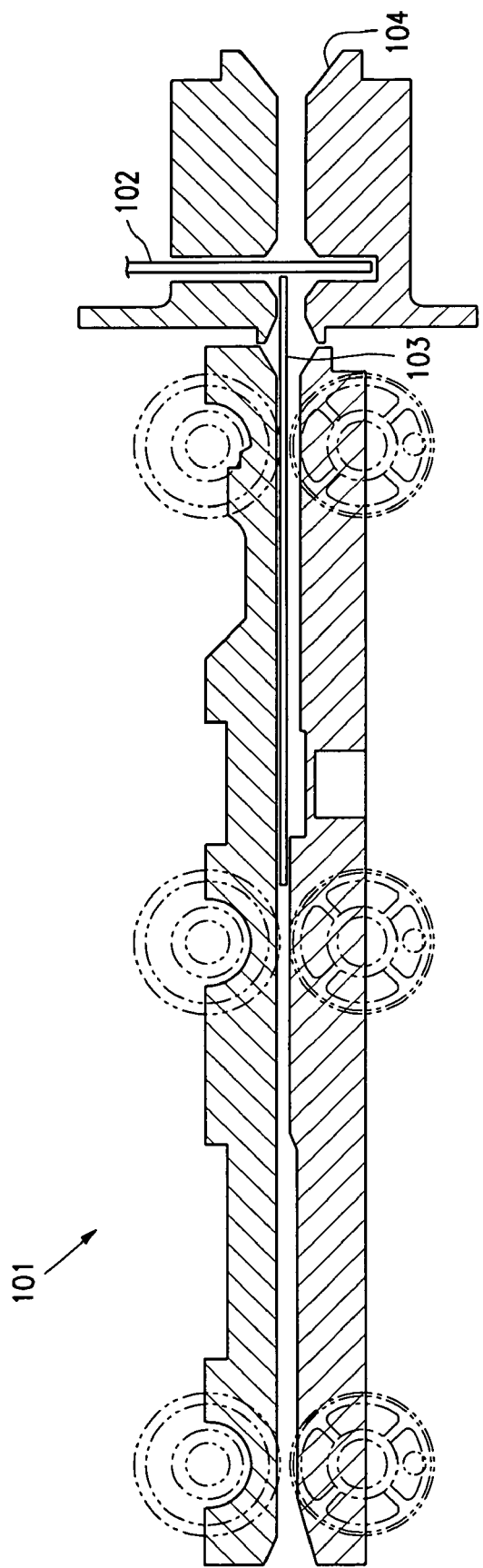
FIG. 10 is a side view showing the diagram of a conventional card reader.

Lock level 70 is a principal member in the pull-out prevention locking mechanism. The entire lever body 71 is molded into the shape of a ratchet gear as shown in FIG. 7 and FIG. 8.

Lever body 71 is connected at this central part or at a location near the tip, to the other end of the conversion lever 63 by means of the above connecting pin 65; the base end of lever body 71, via spindle pin 67, has a shaft supported by bracket 68 provided on the side of housing body 52, so rotary motion is possible.

Therefore, the lever body 71 receives rotational force from conversion lever 63, can rotate forward counterclockwise around the shaft of spindle pin 67, and can also rotate in reverse in the clockwise direction.

Serrated lock teeth 72 form a stopper section of the present invention along the periphery of the tip section of lever body 71.

The distance from lock teeth 72 to the spindle pin 67 gradually increases from lock teeth 72a on one end to lock teeth 72b on the other end; in other words, the radius of rotation R having spindle 67 as the center of rotation constitutes R1< . . . <R2 so that there is a gradual increase from the radius of rotation R1 of lock teeth 72a to the radius of rotation R2 of lock teeth 72b.

Further, lever body 71 of the lock lever 70 is a laminated structure including a multiplicity of layers, and is constructed by having side plates 73 molded from slightly thicker steel plates on both sides of the width direction, and laminating between the side plates 73, for example, four gear plates 74 of the same shape and size molded from thin steel plates into nearly the same shape.

The above lock teeth 72a, 72b are formed from one end to the other end of the periphery in each sheet of gear plate 74, and the tips of the lock teeth 72a, 72b are formed into a larger size and shape so that they protrude only slightly to the outer side from the periphery of the side plate 73.

Because the area of lever body 71 is increased by means of the laminated structure, lock teeth 72a, 72b can come into contact with the surface of card medium 54 in as broad an area as possible in the card width direction.

Moreover, as a member working together with the lock lever 70, lock auxiliary plate 75 is provided, which is long enough to extend from the card insertion port 53 to the region of lock lever 70, is somewhat wider than the card width dimension of the card medium 54, and is fixed on a conveying platform 76.

This lock auxiliary plate 75 is capable of sandwiching and locking the card medium 54 between the lock teeth 72 of the lock lever 70.

Next, an enlarged view of the major components of the push-back prevention locking mechanism in card locking mechanism 60 are shown in the circle in FIG. 9A. In the above stationery frame 61, in elongated hole 61a extending to the back end of the frame in the lengthwise direction is provided. In the above movable frame 62, an inclined elongated hole 62a inclined to the lengthwise direction is provided in the vicinity of the back end of above movable frame 62.

Elongated hole 61a of the stationary frame 61 and inclined elongated hole 62a of the movable frame 62 are connected by lock pin 80 that passes through the two elongated holes.

Namely, movable frame 62 moves flexibly and has a reciprocal motion to stationary frame 61. This reciprocal motion of movable frame 62 causes the position of inclined elongated hole 62a to shift with respect to elongated hole 61a of stationary frame 61, together with the lock pin 80.

Lock pin 80 is linked with an energizing spring 81 that energizes it from the normal position toward the direction of the card insertion port 53 at the right side of the diagram.

Moreover, a lock auxiliary pin 82 is provided overall by attachment to the vicinity of the back end section of the movable frame 62.

Lock auxiliary pin 82 is guided by contact with the lower end face of the stationary frame 61 in the lengthwise direction and moves along with the reciprocal motion of movable frame 62.

Therefore, such a movable frame 62 is detained by the holding device 56 at a normal position in a state opposing the elastic force of the energizing spring 81. If the holding device 56 operates to release the holding, a forward action toward the right of diagram is made possible by the energizing spring 81.

Furthermore, such a push-back prevention locking mechanism has a lock release lever 83 for releasing the above lock pin 80 from the lock position, and has a spring member 84 held by elastic force around the rotary shaft of lock release lever 83.

That is, by the rotary operation of lock release lever 83, end 84a of spring member 84 is pushed against lock pin 80 so that lock pin 80 in the lock status can be moved from the lock position to release.

Further, Label No. 7 in FIGS. 5 and 6 refers to microswitches that transmit switching signals to drive source 55. Elastic contact piece 57a protruding outside can engage or disengage with a convex contact point 63a provided on the above conversion lever 63.

Namely, the drive source 55 operates, based on signal detecting an abnormal stopping of card medium 54. When the holding of movable frame 62 of the card locking mechanism 60 is released to enable forward motion from the normal position, conversion lever 63 rotates to detach convex contact point 63a from elastic contact piece 57a to turn micro switch 57 on or off.

Operations of the above-mentioned card reader are explained below.

When card medium 54 is inserted from card insertion port 53, judgment on whether card medium 54 is a prescribed card or not is based on detection signal from a monitor sensor. If it is judged to be a prescribed card, the protection shutter is opens to enable the insertion of the card medium 54 into the card reader body 51.

When the protection shutter is opened and card medium 54 is inserted further into the interior, conveying rollers convey card medium 54 to reading position, etc., to perform processing such as read/write.

During the operation, immediately after a customer inserts the card medium 54, card medium 54 sometimes stops abnormally near the card insertion port 53 and is held there due to failures in the internal mechanism or electrical system of card reader body 51.

Also, a wrongdoer may tamper with the card reader so that card medium 54 inserted by a customer will be purposely stopped while the shutter is in the open state.

There is concern that the instant the unknowing customer leaves the site to find a clerk, the wrongdoer can pull out the card medium 54 and commit fraud.

When the shutter is in an open state, if the monitoring device such as medium detection sensors, etc. detects the abnormal stopping of card medium 54, an operating signal is sent to drive source 55 based on the detection signal, and holding device 56 operates to release the holding of the movable frame 62 held in the normal position.

Movable frame 62 released from holding moves forward to card insertion port 53 by means of the energizing spring 81. Conversion lever 63 connected to the front end of movable frame 62 is rotated, and lock lever 70 is rotated forward counterclockwise around the shaft of spindle pin 67 via conversion lever 63.

Lock lever 70 rotated forward counterclockwise is brought into contact with the surface of card medium 54 where lock teeth 72 of the lever body 71 have stopped abnormally.

When a customer leaves the site to report abnormal stopping of the card medium 54, if a wrongdoer attempts to pull out card medium 54 during the absence to commit fraud, the pull-out prevention locking mechanism of card locking mechanism 60 functions first.

When, by pull-out force P exerted by the wrongdoer, there is attempted counterclockwise rotation around the shaft of spindle pin 67 by lock lever 70 in contact with the surface of card medium 54, lock teeth 72 operate to bite into the card surface.

As pull-out force exerted by the wrongdoer increases more and more, lock teeth 72 gradually rotates and moves from lock teeth 72a having rotation radius R1 to lock teeth 72b having larger rotation radius. In conjunction with this move, the biting force of lock teeth 72 into the surface of card medium 54 in doubled.

In other words, card medium 54 is locked and kept in a stop position by the one-way system of increase in anti-moving force (locking force) toward card medium 54 and lock lever 70, working in the direction of pull-out force P.

When lock teeth 72 bite into the card surface, in the present practical embodiment including thin steel plates, lock teeth of four gear plates 74 bite into the surface of card medium 54, side plates 73 on both sides including thick plates exert pressure on the surface of card media 54 from the peripheral faces.

Because lever body 71, in this way, is broad and wide because of the laminated structure of side plates 73 and gear plates 74, there is contact over a broad area on the surface of card medium 54 in the card width direction. Theft and fraudulent use of card medium 54 by a wrongdoer is effectively prevented.

On the other hand, there is the situation where the wrongdoer makes the judgment that card medium 54 cannot be removed by merely pulling out, because of the action of the pull-out prevention locking mechanism of card locking mechanism 70. However, attempts are then made instead, to push the card medium 54 further back. By repeating the pulling and pushing, wrongful removal of card medium 54 is persistently continued.

In such a case, the following push-back prevention locking mechanism in card locking mechanism 70 operates.

If a wrongdoer attempts to push back card medium 54 to the interior of the device in the direction opposite to pull-out force P, lock lever 70 that functions in a one-way direction rotates slightly in reverse in the clockwise direction by the push-back force, locking force from lock teeth 72 loosens, and card medium 54 moves in the card conveying direction to the left in the diagram.

However, the movement of card medium 54 is also controlled to a slight extent. Namely, the push-back force of the wrongdoer is transmitted in reverse from the lock lever 70 to the conversion lever 63, and is converted to a backward motion toward the left in the diagram in the direction against the energizing spring 81 of the movable frame 62 via this conversion lever 63.

If movable frame 62 goes back, the accompanying movement of the lock pin 80 inside the inclined elongated hole 62a is also guided by the elongated hole 61a of the stationary frame 61.

Sooner or later, they move as a unit toward the left of the diagram. Lock pin 80 approaches the intersection of the slant face of the inclined elongated hole 62a of movable frame 62 and the horizontal surface of elongated hole 61a of stationary frame 61. Further movement of the lock pin 80 is prevented by applying strong pressure sandwiching the slanted face and the horizontal face at the intersection tp provide a locked state.

In such a locked state for lock pin 80, lock auxiliary pin 82 moving with movable frame 62 is guided by contact with the lower end face of stationary frame 61 in the lengthwise direction to prevent floatup caused by the force of the slanted face of movable frame 62, consequently, because the force preventing floatup of movable frame 62 also acts on lock pin 80, lock pin 80 is firmly locked by the three-point support of the horizontal face of elongated hole 61a, the slanted face of inclined elongated hole 62, and the contact face of lock auxiliary pin 82.

When lock pin 80 is locked, the movement of the movable frame 62 in the push-back direction is restrained, the reverse rotation of lock lever 70 stops, there is no change in the locking force toward card medium 54; even if a wrongdoer makes persistent attempts to remove the card by pulling then pushing back card medium 54, these attempts are obstructed. Card medium 54 is safely protected to prevent theft and fraudulent use.

As described above, when the pull-out prevention locking mechanism and push-back prevention locking mechanism of the card locking mechanism 60 are in operation, the lock auxiliary plate 75 in tandem with lock lever 70 on conveying platform 76 sandwiches the front and rear faces of card medium 54 from above and below by assisting the locking force of lock lever 70 by providing frictional force. This proves useful in offsetting the card pull-out and push-back forces exerted by the wrongdoer.

Moreover, the above is described as one example of a suitable embodiment of the present invention, but the present invention is not limited thereto, and various modified practical embodiments are possible in the range wherein there is no deviation from the substance of the present invention.

For example, instead of the serrated lock teeth 72 which are effective in increasing the biting force in a one-way direction and are provided in lock lever 70, lock bearings, etc. which are one-way mode rotators embedded at proper pitch along the periphery of lever body 71 can also be used as stopper configuration mentioned in the present invention.

Moreover, a structure wherein ratchet pawls which rotate one way around spindle pin 67 that supports the spindle for lever body 71 are provided to completely control the clockwise reverse rotation of lever body 71 can also be applied in the constitution of above embodiment.

Furthermore, the shape of lock lever 70 is molded in its totality into a cam shape, and the cam face is processed into a curved surface such that rotation radius R of spindle pin 67 gradually increases. Thereby, the surface of the card medium is pressed by the cam face to increase the locking force and prevent theft and fraudulent use by wrongful actions.

As described above, when the card medium is abnormally stopped in the card reader, the needle is made to protrude from the rear side of the IC chip by the drive device. If attempts are made to pull out the card medium, the needle pierces the card medium to damage the IC chip or peel it from the card medium. Therefore, wrongful use of the card medium can be prevented because the card medium cannot be used even if the card medium is forcibly pulled out.

Moreover, when the needle does not touch the rear side of the IC chip, the card medium is not damaged if attempts are not made to pull out the card medium. Therefore damage to the card medium can be prevented at the time of abnormal stopping except in the case where a wrongdoer stops the card medium abnormally with the intention of wrongfully pulling out the card medium.

Furthermore, the damaging force to the card medium can be adjusted by regulating the rotational speed of the driving device. Namely, the damaging force can be reduced by increasing the rotational speed, or the damaging force can be increased by decreasing the rotational speed. Moreover, control is possible whereby the needle protrudes with a weak force, hits the card medium, and then receives intensifying pressing force. Accordingly, each card reader can implement its desired control.

Furthermore, because the needle protrudes into the card path when there is abnormal stopping of the card medium that was taken further back inside, the card medium cannot be pulled out. Accordingly, pull-out can be prevented without damaging the card medium. Moreover, wrongful pull-out of the card medium can be prevented, even if it is card medium other than a card medium provided with an IC chip.

Therefore, the lock member of the card locking mechanism brings the stopper configuration into contact with the surface of the abnormally stopped card medium, by gradually increasing this contact force to increase the locking force, and locking the card medium in the holding position by preventing movement, the present invention can effectively prevent a third party with wrongful intentions from performing wrongdoing by pulling out the abnormally stopped card medium for fraudulent use.

Moreover, the stopper configuration of the lock member is molded in a serrated shape where the biting force gradually increases from one end to the other end on contact with the card medium, so that the locking force is increased on biting into the surface of the card medium.

Furthermore, the contact area with the card medium is increased to increase the locking force, by increasing the thickness dimension of the width in the locking member by laminating multiple sheets of stopper configuration that were molded in serrated shape as the stopper configuration.

Further, the stopper configuration of the lock member is molded like a cam face with gradually increasing curvature, to increase the pressure contact force on contact with the card medium gradually from one end to the other, so that the pressure contact force toward the card medium is increased by the cam force wherein the rotation radius increases gradually from the spindle pin.

Furthermore, it is possible if one-way bearings are utilized, to have the stopper configuration of the lock member come in contact with the card medium sequentially from one end to the other end to increase the pressure contact force in only one direction and not apply the contact force in the reverse direction.

Moreover, when abnormal stopping of the card medium is detected, the reliability of the action is increased, wherein the lock member comes into contact with the surface of the card medium by its positive rotation, when the movable member moves forward by receiving power from the drive source.

Further, if the card medium is pushed back in reverse by a wrongful action, the lock member rotates in reverse to decrease the locking force on the card medium by operating the push-back prevention locking mechanism to prevent such inexpedience. By this means, when locking is effected by hindering the backward motion of the movable member, persistent action by a wrongdoer, for example, is prevented, where the card medium is repeatedly pulled or pushed back alternately to remove the card medium.

Furthermore, the backward movement of the movable member can be hindered by utilizing the action wherein by moving the lock pin together with the movable member to a predetermined location in the inclined elongated hole, the movable member is sandwiched in the slanted face of the inclined elongated hole. Reverse push-in action on the card medium by a wrongdoer can be prevented

The invention claimed is:

1. A card reader, comprising:
a card locking mechanism locking a card medium in an immovable holding position when the card medium inserted from a card insertion port provided in a front section of a card reader body stops because of abnormal stopping, thus preventing wrongful removal of the card medium by withdrawal,
wherein the card locking mechanism includes a spindle able to rotate via a spindle pin at one end inside the card reader body at the card insertion port, and a stopper configuration enabling direct contact with a surface of the card medium provided along a periphery at another end, a rotation radius includes a distance from the spindle pin to the stopper configuration being gradually increased from one end of the stopper configuration to another end to increase locking force by contact with the card medium.

2. The card reader described in claim 1 wherein the stopper configuration of the locking mechanism is molded into serrations that come in contact and bite into the card medium gradually from one end to the other end.

3. The card reader described in claim 1 wherein multiple sheets of the serrated stopper configurations are laminated to increase a contact area of the locking mechanism with the card medium.

4. The card reader described in claim 1 wherein the stopper configuration of the locking mechanism is molded into shape like a cam face so that pressure contact force with the card medium gradually increases from one end to the other end.

5. The card reader described in claim 1 wherein stopper configuration of the locking mechanism includes a one-way rotor which increases contact pressure to the card medium in such a manner that pressure contact force increases gradually from one end to the other end.

6. The card reader described in claim 1 wherein the card locking mechanism further includes a movable member which is connected to the locking mechanism via the spindle pin and is capable of providing reciprocal motion in a direction toward the card insertion port; the movable member is activated when a signal detects abnormal stopping of the card medium, the locking mechanism is rotated forward around an axis of the spindle pin so the stopper configuration comes into contact with the card medium and locking is possible.

7. The card reader described in claim 6 wherein the movable member is provided with a push-back prevention locking mechanism that stops reverse rotation of the locking mechanism, and by locking, prevents backward movement, when the card medium is pushed back in reverse by wrongful actions.

8. The card reader described in claim 7 wherein the push-back prevention locking mechanism has an elongated hole inclined in a lengthwise direction, which is a direction of reciprocal motion in the movable member, a lock pin is engaged with the inclined elongated hole and can move with the movable member by engagement with a lock position on an inclined face in the inclined elongated hole in the lock pin and backward motion of the movable member is restricted.

9. A card reader, comprising:
a means for locking a card medium in an immovable holding position when the card medium inserted from a card insertion port provided in a front section of a card reader body stops because of abnormal stopping, thus preventing wrongful removal of the card medium by withdrawal,
wherein the means for locking includes a spindle able to rotate via a spindle pin at one end inside the card reader body at the card insertion port, and a stopper configuration enabling direct contact with a surface of the card medium provided along a periphery at another end, a rotation radius includes a distance from the spindle pin to the stopper configuration being gradually increased from one end of the stopper configuration to another end to increase locking force by contact with the card medium.

10. The means for locking the card reader described in claim 9 wherein the stopper configuration of the locking mechanism is molded into serrations that come in contact and bite into the card medium gradually from one end to the other end.

11. The card reader described in claim 9 wherein multiple sheets of the serrated stopper configurations are laminated to increase a contact area of the means for locking with the card medium.

12. The means for locking the card reader described in claim 9 wherein the stopper configuration of the means for locking is molded into shape like a cam face so that pressure contact force with the card medium gradually increases from one end to the other end.

13. The means for locking the card reader described in claim 9 wherein stopper configuration of the means for locking includes a one-way rotor which increases contact pressure to the card medium in such a manner that pressure contact force increases gradually from one end to the other end.

14. The card reader described in claim 9 wherein the means for locking further includes a movable member which is connected to the means for locking via the spindle pin and is capable of providing reciprocal motion in a direction toward the card insertion-port; the movable member is activated when a signal detects abnormal stopping of the card medium, the means for locking is rotated forward around an axis of the spindle pin so the stopper configuration comes into contact with the card medium and locking is possible.

15. The card reader described in claim 14 wherein the movable member is provided with a push-back prevention locking mechanism that stops reverse rotation of the means for locking, and by locking, prevents backward movement, when the card medium is pushed back in reverse by wrongful actions.

16. The card reader described in claim 15 wherein the push-back prevention locking mechanism has an elongated hole inclined in a lengthwise direction, which is a direction of reciprocal motion in the movable member, a lock pin is engaged with the inclined elongated hole and can move with the movable member by engagement with a lock position on an inclined face in the inclined elongated hole in the lock pin and backward motion of the movable member is restricted.

17. The card reader described in claim 9 further comprising a sensor.

\* \* \* \* \*